(12) United States Patent
Sun et al.

(10) Patent No.: US 6,400,882 B1
(45) Date of Patent: Jun. 4, 2002

(54) APPARATUS FOR FABRICATING OPTICAL BACKPLANES

(75) Inventors: Maurice X. Sun, Westmont; Igor Grois, Northbrook; Thomas R. Marrapode, Naperville, all of IL (US)

(73) Assignee: Molex Incorporated, Lisle, IL (US)

(*) Notice: Subject to any disclaimer, the term of this patent is extended or adjusted under 35 U.S.C. 154(b) by 98 days.

(21) Appl. No.: 09/645,624

(22) Filed: Aug. 24, 2000

(51) Int. Cl.7 .................................................. G02B 6/00
(52) U.S. Cl. ....................... 385/134; 385/135; 385/147; 385/76
(58) Field of Search ................................. 385/134–138, 385/147, 76

(56) References Cited

U.S. PATENT DOCUMENTS

| | | | |
|---|---|---|---|
| 4,450,623 A | 5/1984 | Burr | 29/850 |
| 5,259,051 A | 11/1993 | Burack et al. | 385/76 |
| 6,330,398 B1 * | 12/2001 | Daoud et al. | 385/135 |

* cited by examiner

Primary Examiner—Phan T. H. Palmer
(74) Attorney, Agent, or Firm—A. A. Tirva

(57) ABSTRACT

An apparatus routes an optical fiber from a supply thereof onto a surface of a substrate which may have an adhesive thereon. A routing head is movable over the surface of the substrate in a given circuit pattern. Drive rollers feed the optical fiber from the supply to the routing head. A feed needle on the routing head receives the optical fiber from the drive rollers and lays the fiber onto the surface of the substrate at an angle thereto as the routing head moves thereover. The inherent stiffness of the angled optical fiber biases the fiber against the adhesive on the surface of the substrate as the fiber is layed onto the surface in the given circuit pattern.

13 Claims, 3 Drawing Sheets

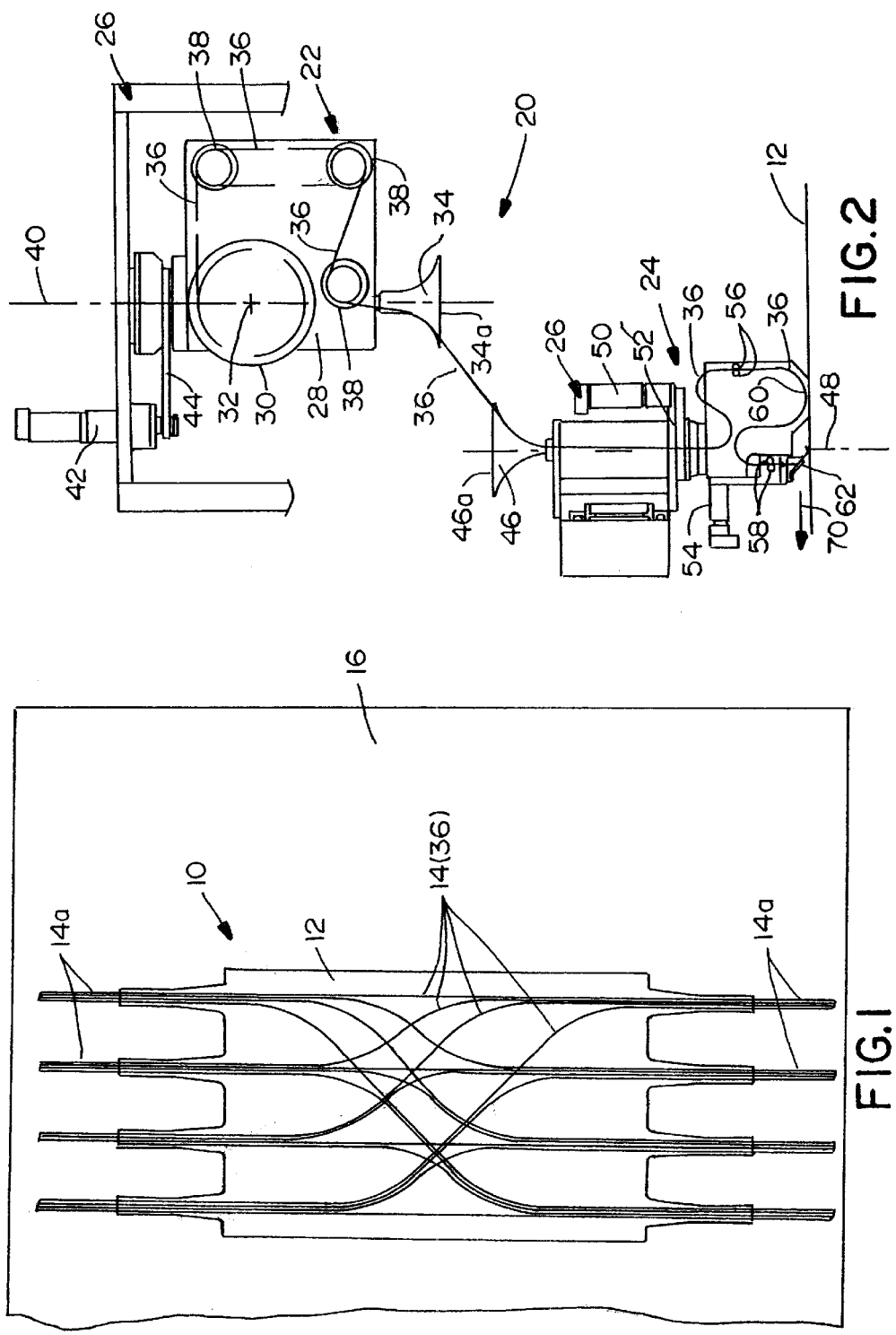

APPARATUS FOR FABRICATING OPTICAL BACKPLANES

FIELD OF THE INVENTION

This invention generally relates to the art of fiber optic transmissions and interconnections and, particularly, to optical backplanes.

BACKGROUND OF THE INVENTION

Optical backplanes are increasingly being used in electronics systems where circuit density is ever-increasing and is difficult to provide with known electrically wired backplanes. An optical backplane is formed by a plurality of optical fibers mounted or routed on a substrate in a given pattern or circuit geometry. Optical backplanes are used to interconnect optical circuit components which transmit signals optically, as well as electrical circuit components, wiring boards, modules and/or integrated circuits. When an optical backplane interconnects electrical components, the electrical energy of each component is translated to optical energy which is transmitted by optical fibers on the optical backplane to another electrical component where it is translated back to electrical energy for transmission to the other electrical component. Optical fibers can transmit much more information than electrical conductors and with significantly less signal degradation.

Optical backplanes are fabricated in a variety of manners, ranging from laying the optical fibers on the substrate by hand to routing the optical fibers in a given pattern onto the substrate by mechanized apparatus. Most such apparatus are complex and expensive to manufacture and are difficult to maintain. The present invention is directed to providing a simple, efficient and reliable apparatus for use in fabricating optical backplanes.

SUMMARY OF THE INVENTION

An object, therefore, of the invention is to provide a new and improved apparatus for routing an optical fiber from a supply thereof onto a surface of a substrate which may have an adhesive thereon.

In the exemplary embodiment of the invention, the apparatus includes a routing head which is movable over the surface of the substrate in a given circuit pattern. Drive means is provided for feeding the optical fiber from the supply to the routing head. A feed needle on the routing head receives the optical fiber from the drive means and lays the fiber onto the surface of the substrate at an angle thereto as the routing head moves thereover. The inherent stiffness of the angled optical fiber biases the fiber against the adhesive on the surface of the substrate as the fiber is layed onto the surface in the given circuit pattern.

As disclosed herein, the supply of optical fiber comprises a rotatable reel upon which the optical fiber is wound and off of which the fiber is pulled by the drive means. The feed needle extends at an angle to the surface of the substrate and terminates in a distal end extending generally parallel to the substrate. The distal end has an open channel on the outside thereof facing the surface of the substrate and through which the optical fiber is fed to the surface.

According to one aspect of the invention, the drive means is provided by a pair of drive rollers sandwiching the optical fiber therebetween. Second drive rollers are provided nearer to the feed needle than the pair of drive rollers and establish a fiber loop therebetween.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is plan view of an optical backplane as might be fabricated by the apparatus of the invention;

FIG. 2 is a somewhat schematic illustration of the apparatus of the invention;

DETAILED DESCRIPTION OF THE PREFERRED EMBODIMENT

Figure 3:
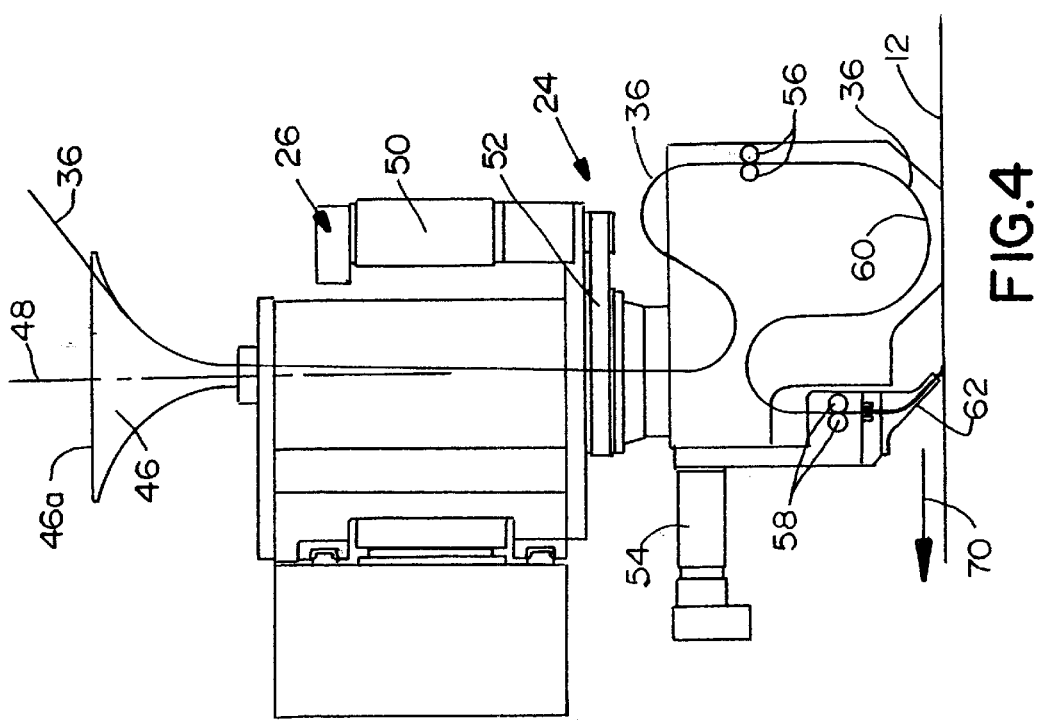
FIG. 3 is an enlarged view of the supply head of the apparatus.

Referring to the drawings in greater detail, and first to FIG. 1, the invention is embodied in an apparatus for fabricating an optical backplane, generally designated 10. The optical backplane is typical and includes a flat substrate 12 having a plurality of optical fibers 14 routed thereon in a given circuit pattern. The ends 14a of the optical fibers extend beyond substrate 12 for connection to a wide variety of components, such as optical transmission components as well as electrical transmission components ranging from wiring boards to circuit modules and/or integrated circuits. Optical backplane 10, including substrate 12 and optical fibers 14, are fabricated on top of an enlarged release sheet 16. Before optical fibers 14 are laid onto substrate 12, the substrate and release sheet 16 are coated with an adhesive. Therefore, optical fibers 14 will adhere to substrate 12 and fiber ends 14a will adhere to release sheet 16. The release sheet is removed after fabrication and the substrate and fibers are coated with a non-adhesive material.

Figure 4:
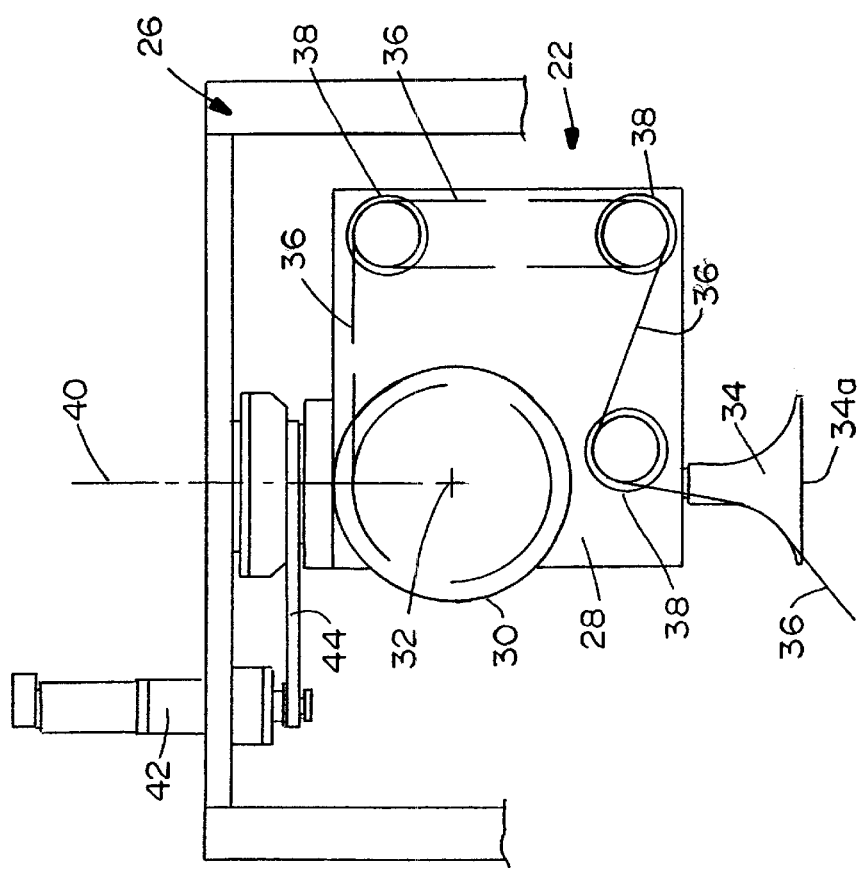
FIG. 4 is an enlarged view of the routing head of the apparatus.

FIGS. 2–4 show somewhat schematically an apparatus, generally designated 20, for fabricating optical backplanes, such as backplane 10, by routing optical fibers 14 onto the surface of substrate 12 (as well as release sheet 16). In particular, apparatus 20 includes a supply head, generally designated 22, and a routing head, generally designated 24. The apparatus is mounted on an overall framework, generally designated 26, only a top portion of which is shown in the drawings.

Referring to FIG. 3 in conjunction with FIG. 2, supply head 22 includes a mounting block 28 on which a supply reel 30 is mounted for rotation about an axis 32 and is rotated by a motor (not shown) at a speed which is synchronized with the speed at which the fiber 14 is layed on the substrate 12. A distribution horn 34 depends from mounting block 28 and has a flared open end 34a. An optical fiber 36 is pulled off of supply reel 30, around a series of pulleys 38 and downwardly through distribution horn 34. The pulleys 38 create a compensation loop of fiber 36 which allows routing head 24 to move when no fiber laying is taking place. The entire mounting block, including supply reel 30, distribution horn 34 and pulleys 38, is rotatable about a vertical axis 40 by means of a motor 42 and a belt 44, the motor being mounted on framework 26.

Referring to FIG. 4 in conjunction with FIG. 2, routing head 24 includes an upwardly directed receiving horn 46 having a flared mouth 46a for receiving optical fiber 36 from distribution horn 34 of supply head 22. Routing head 24 is rotatable about a vertical axis 48 by means of a motor 50 and a belt 52. Supply head 22 and routing head 24 are rotated in synchronization so that optical fiber 36 does not twist therebetween. A lifting motor 54 is provided for moving routing head 24 vertically, i.e., generally perpendicular to substrate 12. A first pair of drive rollers 56 sandwich optical fiber 36 therebetween and pull the optical fiber from supply head 22 off of pulleys 30. A second pair of drive rollers 58 are provided down-line of drive rollers 56 to form a fiber loop 60 therebetween. The surfaces of the drive rollers may be of a fiber-gripping material such as rubber. Finally, optical fiber 36 is fed to a feed needle 62 which lays the optical fiber onto the top surface of substrate 12 (and release sheet 16) which has the adhesive layer thereon.

Figure 5:
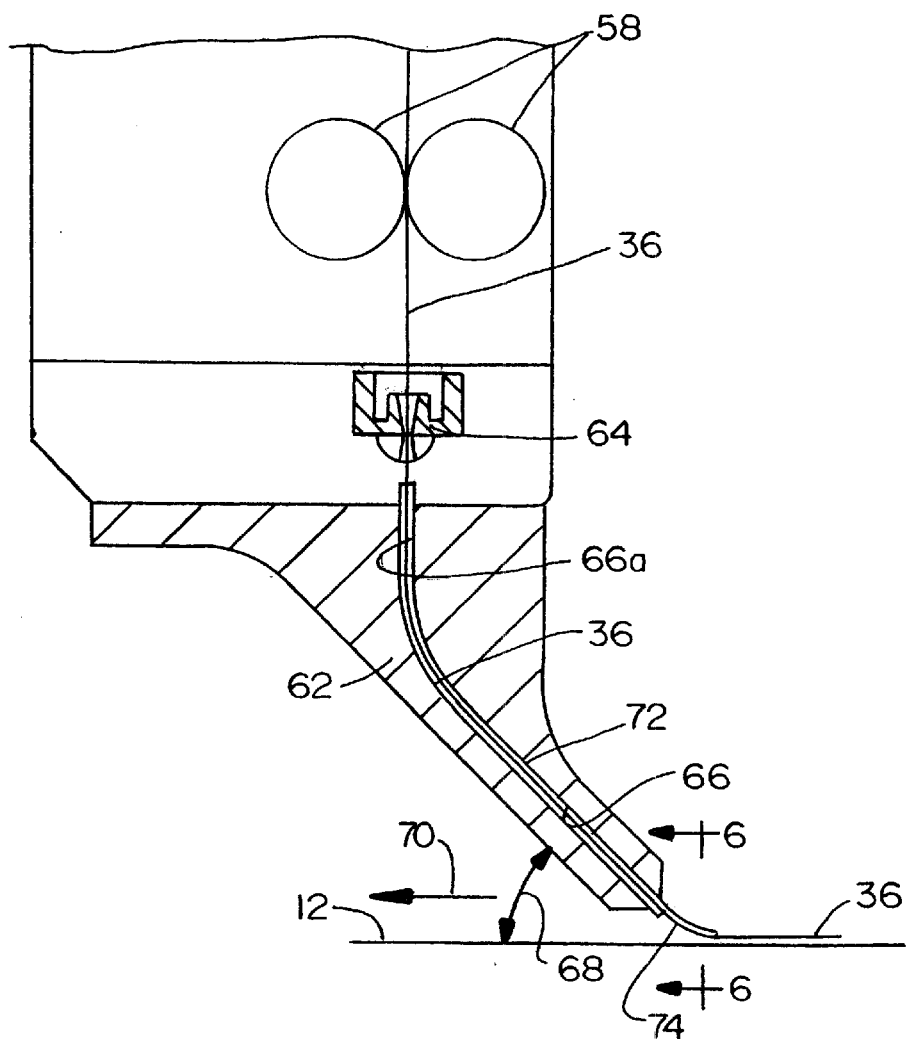
FIG. 5 is a further enlarged view of the feed needle area of the routing head.

Referring to FIG. 5 in conjunction with FIGS. 2 and 4, optical fiber 36 is fed from drive rollers 58 through a cutoff mechanism 64 to feed needle 62 which has an internal passage 66. Although a top portion 66a of the passage is oriented vertically to receive optical fiber 36 from eye 64, the needle and passage are at approximately a 45° angle 68 relative to substrate 12 as the needle lays optical fiber 36 onto the substrate in the direction of arrow 70.

Figure 6:
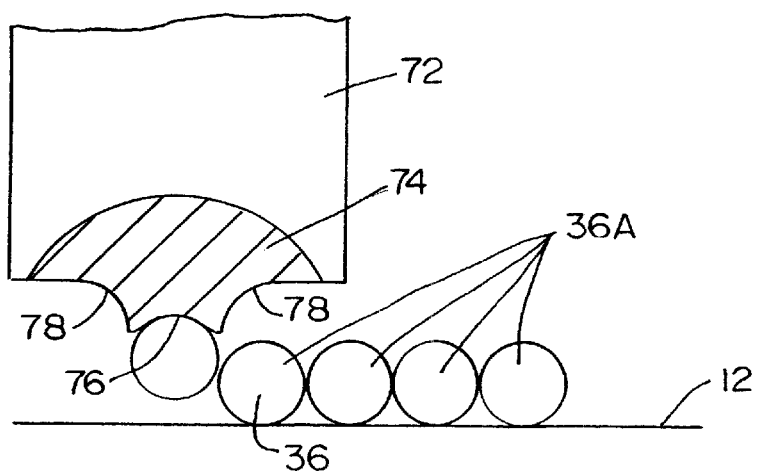
FIG. 6 is a still further enlarged section taken generally along line 6—6 of FIG. 5.

Referring to FIG. 6 in conjunction with FIG. 5, passage 66 (FIG. 5) actually is formed within a needle tube 72 embedded within needle 62. The needle tube has a distal end 74 which curves to an orientation generally parallel to substrate 12. The bottom of distal end 74 is provided with an open channel 76 as best seen in FIG. 6, the channel being on the outside of the distal end facing the surface of substrate 12. The distal end is recessed, as at 78, to avoid any possible interference with previously laid optical fibers 36a.

In operation, it can be seen best in FIG. 5 that optical fiber 36 is laid onto the surface of substrate 12 at an angle 68. As is known, optical fibers are generally brittle and rather stiff. Consequently, as the angled or bent optical fiber is laid onto the substrate as routing head 24 moves in the direction of arrow 70 (FIGS. 2, 4 and 5), a vertical force vector is created by the stiffness of the bent optical fiber to bias the optical fiber against the adhesive on the surface of substrate 12. Drive rollers 56 are synchronized with the speed of routing head 24 translating over the substrate so that the drive rollers feed optical fiber 36 to feed needle 62 at the same speed that the routing head moves over the substrate.

In actual practice, second drive rollers 58 are used only at the start of laying a length of optical fiber onto the substrate, such as the beginning of one of the fiber ends 14a shown in FIG. 1. These second drive rollers are rotated slightly faster than the speed with which routing head 24 moves over the substrate to add an increment of force to the optical fiber to facilitate forcing the fiber against the adhesive on the substrate (actually release sheet 16). That is why a supply buffer loop 60 of the optical fiber is maintained between first drive rollers 56 and second drive rollers 58. After a short initial increment of travel of routing head 24, second drive rollers 58 are moved apart to release the feeding pressure on the optical fiber. This allows the fiber to be freely pulled off the supply buffer loop 60 and are allowed to freely rotate.

After a length of optical fiber 14 (FIG. 1) has been layed onto substrate 12 and release sheet 16, the fiber is cut, routing head 24 is lifted, and another optical fiber length or circuit is layed down in a given circuit pattern, such as the pattern shown in FIG. 1. All of the operative motions of apparatus 20, including the translation of routing head 24, the rotation or pivoting of the routing head and supply head 26, the lifting of the routing head, and the rotation and timing of drive rollers 56 and 58, are controlled by a microprocessor as is well within the purview of an artisan.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An apparatus for routing an optical fiber from a supply thereof onto a surface of a substrate having an adhesive thereon, comprising:

a routing head movable over the surface of the substrate in a given circuit pattern;

drive means for feeding the optical fiber from said supply to the routing head; and a feed needle on the routing head for receiving the optical fiber from the drive means and laying the fiber onto the surface of the substrate at an angle thereto as the routing head moves thereover, whereby the inherent stiffness of the angled optical fiber biases the fiber against the adhesive on the surface of the substrate as the fiber is layed onto the surface in said given circuit pattern.

2. The apparatus of claim 1 wherein said feed needle extends at an angle to the surface of the substrate and terminates in a distal end extending generally parallel to the substrate.

3. The apparatus of claim 2 wherein said distal end of the feed needle has an open channel on the outside thereof facing the surface of the substrate and through which the optical fiber is fed to the surface.

4. The apparatus of claim 1 wherein said drive means comprise a pair of drive rollers sandwiching the optical fiber therebetween.

5. The apparatus of claim 4 including a second pair of drive rollers nearer to said feed needle than said pair of drive rollers and establishing a fiber loop therebetween.

6. The apparatus of claim 1 wherein said feed needle has an open channel on the outside thereof facing the surface of the substrate and through which the optical fiber is fed to the surface.

7. The apparatus of claim 1 wherein said supply of optical fiber comprises a rotatable reel upon which the optical fiber is wound and off of which the fiber is pulled by said drive means.

8. An apparatus for routing an optical fiber onto a surface of a substrate having an adhesive thereon, comprising:

a rotatable supply reel upon which the optical fiber is wound;

a routing head movable over the surface of the substrate in a given circuit pattern;

a pair of drive rollers for feeding the optical fiber from the supply reel to the routing head; and a feed needle on the routing head for receiving the optical fiber from the drive rollers and laying the fiber onto the surface of the substrate at an angle thereto as the routing head moves thereover, whereby the inherent stiffness of the angled optical fiber biases the fiber against the adhesive on the surface of the substrate as the fiber is layed onto the surface in said given circuit pattern.

9. The apparatus of claim 8 wherein said feed needle extends at an angle to the surface of the substrate and terminates in a distal end extending generally parallel to the substrate.

10. The apparatus of claim 9 wherein said distal end of the feed needle has an open channel on the outside thereof facing the surface of the substrate and through which the optical fiber is fed to the surface.

11. The apparatus of claim 8 wherein said feed needle has an open channel on the outside thereof facing the surface of the substrate and through which the optical fiber is fed to the surface.

12. The apparatus of claim 8, including a second pair of drive rollers nearer to said feed needle than said pair of drive rollers and establishing a fiber loop therebetween.

13. An apparatus for routing an optical fiber onto a surface of a substrate having an adhesive thereon, comprising:

a rotatable supply reel upon which the optical fiber is wound;

a routing head movable over the surface of the substrate in a given circuit pattern;

a first pair of drive rollers for feeding the optical fiber from the supply reel to the routing head;

a feed needle on the routing head for receiving the optical fiber from the drive rollers and laying the fiber onto the surface of the substrate at an angle thereto as the routing head moves thereover, the feed needle extending at an angle to the surface of the substrate and terminating in a distal end extending generally parallel to the substrate, the distal end having an open channel on the outside thereof facing the surface of the substrate and through which the optical fiber is fed to the surface; and a second pair of drive rollers nearer to the feed needle than the first pair of drive rollers and establishing a fiber loop therebetween;

whereby the inherent stiffness of the angled optical fiber biases the fiber against the adhesive on the surface of the substrate as the fiber is layed onto the surface in said given circuit pattern.

\* \* \* \* \*